United States Patent
Schneider et al.

(10) Patent No.: US 9,778,644 B2
(45) Date of Patent: Oct. 3, 2017

(54) METHOD AND DEVICE FOR CONTROL OF A DRIVE FOR A TOOL OR WORKPIECE

(75) Inventors: Gunter Schneider, Marburg (DE); Christoph Klein, Breidenbach-Niederdieten (DE)

(73) Assignee: Schneider GmbH & Co. KG, Fronhausen (DE)

( * ) Notice: Subject to any disclaimer, the term of this patent is extended or adjusted under 35 U.S.C. 154(b) by 1052 days.

(21) Appl. No.: 13/985,424

(22) PCT Filed: Feb. 9, 2012

(86) PCT No.: PCT/EP2012/000585
§ 371 (c)(1),
(2), (4) Date: Oct. 23, 2013

(87) PCT Pub. No.: WO2012/110214
PCT Pub. Date: Aug. 23, 2012

(65) Prior Publication Data
US 2014/0039665 A1    Feb. 6, 2014

(30) Foreign Application Priority Data
Feb. 14, 2011    (EP) .................................... 11001166

(51) Int. Cl.
*G06F 19/00*    (2011.01)
*G05B 19/18*    (2006.01)
(Continued)

(52) U.S. Cl.
CPC ........... *G05B 19/19* (2013.01); *G05B 13/024* (2013.01); *G05B 19/404* (2013.01); *G05B 2219/49354* (2013.01)

(58) Field of Classification Search
CPC .... G05B 19/19; G05B 19/404; G05B 13/024; G05B 2219/49354
(Continued)

(56) References Cited

U.S. PATENT DOCUMENTS

| 4,947,715 A * | 8/1990 | Council, Jr. .......... B24B 13/046 |
| | | 451/277 |
| 5,541,832 A * | 7/1996 | Nakajima ............... B21B 37/28 |
| | | 700/148 |

(Continued)

FOREIGN PATENT DOCUMENTS

| DE | 196 37 632 A1 | 4/1997 |
| DE | 10 2006 006 162 A1 | 8/2007 |

(Continued)

*Primary Examiner* — Robert Fennema
*Assistant Examiner* — Thomas Stevens
(74) *Attorney, Agent, or Firm* — David S. Safran

(57) ABSTRACT

A method for control of a drive for a tool or workpiece uses pilot control and a device with a control apparatus, the pilot control taking place depending on a frequency of movement. At least one of a frequency component of the reference value, a spectrum of the reference value, and a part thereof is used as the frequency of movement. At least one pilot factor is determined depending on the frequency of movement, and the at least one determined pilot factor, multiplied with a pilot value that corresponds to or is a derivative of the reference variable is used for pilot control. In this way, a contouring error can be advantageously reduced.

20 Claims, 2 Drawing Sheets

(51) Int. Cl.
  *G05B 19/19* (2006.01)
  *G05B 13/02* (2006.01)
  *G05B 19/404* (2006.01)

(58) Field of Classification Search
  USPC .............. 700/29, 159, 178, 280; 318/568.15,
        318/568.16, 568.17, 568.19, 573–577
  See application file for complete search history.

(56) References Cited

U.S. PATENT DOCUMENTS

| | | | |
|---|---|---|---|
| 5,619,581 A * | 4/1997 | Ferguson | G10K 11/1786 381/71.12 |
| 6,039,097 A * | 3/2000 | Kennedy | B27B 1/007 144/242.1 |
| 6,725,129 B2 * | 4/2004 | Kito | G05B 19/416 318/128 |
| 7,031,799 B2 | 4/2006 | Kerner et al. | |
| 7,224,141 B2 | 5/2007 | Ide | |
| 2002/0130277 A1 * | 9/2002 | Halling | H01J 37/3171 250/492.21 |
| 2005/0038646 A1 * | 2/2005 | Berg | H04N 7/06 704/205 |
| 2009/0204259 A1 * | 8/2009 | Danko | G05B 13/024 700/250 |
| 2010/0087934 A1 | 4/2010 | Blum et al. | |
| 2010/0224039 A1 | 9/2010 | Schneider et al. | |
| 2011/0137448 A1 * | 6/2011 | Scherer | G05B 19/4163 700/173 |
| 2012/0298284 A1 * | 11/2012 | Klinstein | B06B 1/0261 156/64 |

FOREIGN PATENT DOCUMENTS

| | | |
|---|---|---|
| EP | 0 849 038 A2 | 6/1998 |
| EP | 1 818 744 A1 | 8/2007 |

* cited by examiner

METHOD AND DEVICE FOR CONTROL OF A DRIVE FOR A TOOL OR WORKPIECE

BACKGROUND OF THE INVENTION

Field of the Invention

This invention relates to a method for control of a drive for a tool or workpiece, especially for producing or machining an optical lens, in which pilot control takes place depending on a frequency of movement which corresponds to a reference variable and to a device with a control apparatus for controlling of a drive, especially for a tool or workpiece, especially preferably for machining of an optical lens, having a pilot control apparatus for pilot control of the drive depending on a frequency of movement which corresponds to a reference variable.

Description of Related Art

Fast and efficient machining of a workpiece with a tool requires a correspondingly fast and exact tool movement. In industrial fabrication, generally so-called "computerized numerical controls" (CNC) are generally used for exact positioning of tools, there being controls of the corresponding drives.

Promptly reaching a target position is a prerequisite for fast and efficient machining. Rates of change of the setpoint which result herefrom however can lead to a so-called contouring error. The contouring error is a characteristic for a control deviation, for a ramp-shaped characteristic of the setpoint a steady-state value for the contouring error being set. The contouring error can be reduced by a control with high gain or speed gain being used, but the risk of the occurrence of instabilities being increased.

In particular, in methods which are encompassed under the expression "high speed cutting", hereinafter also called HSC, very high rates of change of the reference variable or a value which corresponds to it, especially the position setpoint, very high feed rates, very high cutting or machining rates and/or very high accelerations are used. To reduce the contouring error, the use of pilot control is known which roughly pilots a manipulated variable which is to be controlled, therefore, for example, the current of a drive, from a reference variable, therefore especially a position setpoint so that the control need compensate for only comparatively small differences. The use of this pilot control can lead to reduction of the contouring error.

German Patent Application DE 196 37 632 A1 relates to a method for controlling a feed unit of a machine tool, for compensation of the effects of friction and a contouring error which has been induced thereby a pilot value being determined. The latter is added to the control for pilot control of a manipulated variable. A controller cascade is used, the setpoints supplied to this cascade being used for determining the pilot value.

German Patent Application DE 10 2006 006 162 A1 relates to a controller structure for position control, a pilot current for a drive being determined from a position setpoint. This pilot current is differentiated and multiplied by a factor. This factor is designed to make it possible to adapt the pilot control to different applications.

European Patent Application EP 1 439 437 A1 and corresponding U.S. Pat. No. 7,031,799 B2 relate to a method for active damping of low frequency oscillations on numerically controlled machine tools. At a multiplication site, the difference of the derived rpm and the set rpm is multiplied by a factor; this is intended to allow continuous control of the active damping of the low frequency oscillations. However, it is not disclosed how this gain could be determined.

European Patent Application EP 1 560 325 A1 and corresponding to U.S. Pat. No. 7,224,141 B2 relate to a device for monitoring a motor position, a feed lowpass filter being used with a transfer function for elimination of ripples by quantization errors. In particular, a derived position instruction can be amplified and filtered by the lowpass filter for elimination of ripple. With respect to the gain, it is disclosed that it can be between 40 and 50%, but also in the vicinity of 100%. However, it is questionable whether, and optionally how, this factor could be determined.

SUMMARY OF THE INVENTION

The object of this invention is to devise a device or method for controlling of a drive for a tool or workpiece with which contouring errors can be more effectively reduced or avoided.

This object is achieved by a method and a device as described herein.

The method in accordance with the invention relates to the control of a drive for a tool or workpiece, especially for producing or machining an optical lens, pilot control taking place, especially for reduction of a contouring error. In accordance with the invention, the pilot control takes place depending on a frequency of movement which corresponds to a reference variable. Here a frequency of the reference variable or of a characteristic corresponding to it can be determined or computed as the frequency of movement. Depending on the frequency of movement at least one pilot factor can be determined and this pilot factor can be used for pilot control.

It is especially preferred that one or more pilot factors and/or a characteristic of one or more pilot factors is or are especially completely determined and/or stored before the start of machining of the workpiece, preferably a pilot factor or characteristic of the pilot factor depending on the machining frequency or a quantity which corresponds thereto.

The pilot factor can be tracked especially according to the frequency of movement or the quantity corresponding thereto. The quantity which corresponds to the machining frequency is especially a machining parameter, a machining region, a machining time, machining progress, a machining site, a machining speed, a rpm and/or position of the tool, of the workpiece, and of the workpiece relative to one another or any combination of possible quantities corresponding to the frequency of movement, especially a combination of the machining speed and rpm and the position of the tool and workpiece to one another.

In particular, a pilot factor can be determined depending on the machining frequency and this pilot factor can be assigned via the machining frequency to the quantity which corresponds to the machining frequency. In this way the quantity corresponding to the machining frequency can be directly assigned a pilot factor or characteristic of the pilot factor, especially completely prior to the start of the machining.

For example, a pilot factor or characteristic hereof can be directly assigned to a position, rpm and/or other machining parameter via the machining frequency or can be assigned before the start of machining.

A choice and/or tracking of the pilot factor can then take place in machining based on the position, rpm and/or the other machining parameters. Therefore it is not necessary during the machining of the workpiece to determine or compute the machining frequency. Thus the computation effort for analysis of the machining frequency can be shifted forward, as a result of which delays in the machining or tracking of the pilot factor can be avoided during machining.

Preferably a frequency of movement which corresponds to the reference variable is determined and the pilot control takes place depending on the frequency of movement. Alternatively or in addition the frequency of movement can be considered in the pilot control by a filter.

The use of a pilot control to accelerate a control is already known. Pilot controls in this case conventionally use the derivation of a reference variable which is added to a manipulated variable of a control. But to date it has been ignored that the time characteristic of the reference variable can have different frequencies or spectral portions.

For example, during rotation of a workpiece which is non-symmetrical to the axis of rotation a movement of a tool which is synchronized to the revolution of the workpiece takes place. For more complex forms the time characteristic of the reference variable for the tool in spectral analysis also has harmonics or higher harmonics, especially relative to the rotary motion of the workpiece, with partially large amplitudes.

It has been ascertained in accordance with the invention that the pilot control can be optimized and the contouring error can be minimized if the frequency dependency of the contouring error on a frequency of the reference variable or a frequency of movement is considered. For example, a proportional contouring error of a third or fifth harmonic can be especially critical relative to the revolution of a tool or workpiece, especially for forming a free-form surface of an optical lens. In this case, according to this invention it has proven especially advantageous to match the pilot control accordingly, especially adaptively. In particular it is proposed that a frequency of movement which corresponds to the reference variable be determined and the pilot control be adapted depending on the frequency of movement. In this way advantageously the contouring error can be minimized and especially for certain, especially relevant frequencies, frequency ranges or the like can be compensated.

A frequency of movement within the scope of this invention corresponds to the reference variable and especially to a movement of a tool or workpiece defined by the reference variable or to the movement of the drive. The reference variable generally has a time and/or local dependency, especially a dependency on the relative location of the tool to the workpiece which corresponds especially to a position, especially rotary position and/or cross feed, or change in the position of the tool. The (time) change of the reference variable is preferably interpreted as a characteristic which is normally digitized or discretized, therefore is defined especially as a sequence of individual values.

The frequency of movement within the scope of this invention is preferably a frequency which corresponds to this characteristic of the reference variable or a corresponding characteristic of a tool movement or the like. The frequency of movement can be especially an average frequency or for example, a frequency selected by weighting or also amplitude, especially a frequency of especially high amplitude or the like. Preferably to determine the frequency of movement or a filter for taking this into account the reference variable or a characteristic corresponding to it is analyzed, preferably by a transform, especially a discrete and/or Fourier transform. A frequency of the reference variable or of the characteristic corresponding thereto can be determined or computed as a frequency of movement, preferably a frequency or harmonic with the highest amplitude or an average frequency, especially a frequency which has been averaged with consideration of the amplitude. The frequency of movement can depend on the rotational velocity, especially on a rotational velocity of a workpiece relative to the tool.

It is especially preferred in accordance with the invention that a pilot factor (weighting factor) is determined depending on the frequency of movement and this pilot factor, preferably multiplied by a pilot value, is used for pilot control. The use of this pilot factor represents a very simple and effective possibility for influencing the behavior or the degree of pilot control. A pilot value within the scope of this invention corresponds preferably to the reference variable and especially to a derivative of it. The product of the pilot factor and the pilot value, therefore especially the differentiated reference variable which has been weighted with the pilot factor, can be added to the control for pilot control of a manipulated variable. The pilot factor is preferably part of a transfer function of the pilot control.

A workpiece can have different machining regions, and especially also different reference variables and/or frequencies of movement can correspond to them. It is possible in accordance with the invention that for one or more machining regions one or more corresponding frequencies of movement and/or pilot factors are determined especially for the drive and the tool or the workpiece. Alternatively or additionally, it is also possible that for the different machining regions or the frequencies of movement corresponding thereto to be determined. This advantageously enables a selective compensation of the contouring error with consideration of the properties of different regions of the workpiece.

This invention furthermore relates to a device with a control apparatus for controlling a drive, especially for a tool or workpiece, especially preferably for machining of an optical lens, with a controller and a pilot control apparatus. In accordance with the invention the pilot control apparatus is made such that the pilot control takes place depending on a frequency of movement which corresponds to a reference variable.

A manipulated variable of the control can be formed by output signals of the controller and the pilot control apparatus. In particular the device or pilot control apparatus can have a differentiator and a multiplier, and from the difference of the reference variable and a controlled variable the manipulated variable can be generated which can be piloted or pilot controlled with a reference variable which is differentiated by the differentiator and which is weighted by the multiplier with a pilot factor.

The multiplier within the scope of this invention can also be a filter or have a filter, the multiplication by the pilot factor being implemented preferably by damping of the pilot value; this corresponds especially to multiplication by a pilot factor between 0 and 1.

It is furthermore preferred that the control apparatus has several controllers which form a cascaded structure, a pilot control being assigned to one or more of the controllers, especially each with a differentiator and/or multiplier.

According to one preferred configuration, the device is made for cutting of an optical lens, in particular the device is made for face-turning and/or as a (face) miller or lathe. The device preferably has at least one drive for a tool and a workpiece spindle with a fixture for holding a lens blank, the drive respectively or the tool being arranged or formed for machining of the lens blank. Preferably at least one manipulated variable, especially of the controller or the control apparatus, forms a control signal for the drive.

This invention calls in particular for a damping of the pilot control which is dependent on the frequency of movement.

For example, the pilot control is designed or calibrated to a high maximum frequency of movement and is damped at other especially lower frequencies of movement. The frequency dependency of the damping can be predetermined especially by corresponding tests or calibrations and for example, can be stored or can be available by a corresponding table, function or the like.

The variation of the pilot control which is dependent on the frequency of movement can be selectively determined and established before the actual machining or takes place preferably continuously during the actual machining, and if necessary however also predetermined values such as the frequency-dependent damping values or pilot factors can be used. In particular the latter is possible in accordance with the invention due to the comparatively low computation effort and can be implemented very easily while machining is underway.

The invention is explained below using the especially preferred field of the production or machining of an optical lens. To do this especially reference is made to a tool movement for face turning. But the invention can also be used for other drives for tools or workpieces. They include especially methods for cutting, especially milling, turning, drilling, planing or the like, especially in conjunction with high speed cutting.

Other aspects, features, advantages and properties of this invention will become apparent from the claims and from the following description of one preferred exemplary embodiment using the drawings.

DETAILED DESCRIPTION OF THE INVENTION

Figure 1:
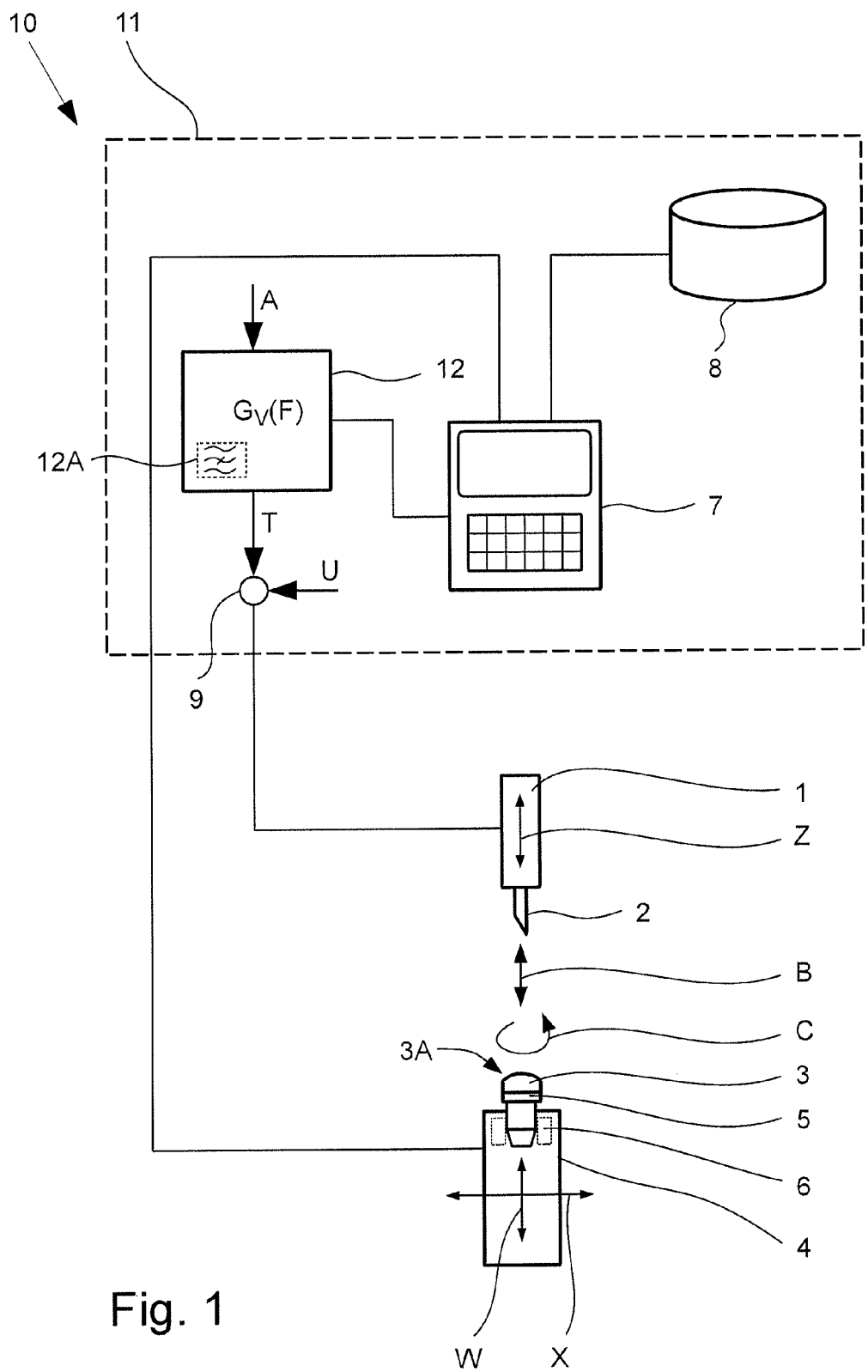
FIG. 1 shows a schematic structure of a device in accordance with the invention for cutting.

FIG. 1 shows a device 10 in accordance with the invention for cutting, preferably by turning, especially by face turning. The device 10 has preferably one drive 1 for driving or moving especially one assigned tool 2 or the like. Especially preferably the tool 2 is a machining tool, in the illustrated embodiment for machining of a workpiece 3.

The tool 2 for example, is made as a cutting tool, especially a turning tool or the like. Alternatively or in addition the tool 2 however can also be some other tool for machining, or a feeler, a measuring head, a sensor or the like.

In the illustrated example the tool 2 can be moved preferably linearly back and forth by means of the drive 1 or can be moved in a Z axis, especially for machining of the workpiece 3.

The drive 1 is for example, a servo, a highly dynamic motor or other actuator, especially the drive 1 is a complex, preferably electrically driven axle drive, such as a moving coil drive or the like, especially preferably a so-called fast tool drive.

The tool 2 is controlled in its axial position or Z axis or is moved quickly forward and backward especially depending on the rotary position of the workpiece 3 and/or depending on the distance of the tool 2 from the axis of rotation of the workpiece 3.

The drive 1 allows a preferably linear and/or controlled or regulated movement of the tool 2 and therefore forms preferably one Z-axis.

The workpiece 3 is especially a lens or lens blank which is to be machined. The workpiece 3 or the lens or the lens blank preferably consists of plastic, for example, CR-39 or polycarbonate. But fundamentally also some other material which can be suitably machined, optionally also glass or mineral glass, can be used. The finished lens is preferably used for eyeglasses (not shown).

For machining of the workpiece 3 the latter can preferably be rotated. In the illustrated example the device 10 for this purpose has preferably one tool spindle 4 which is assigned to the workpiece 3.

The workpiece spindle 4 is especially a preferably directly driven, precision-mounted shaft or a direct drive or some other drive with a preferably integrated or assigned holding fixture 5 for the workpiece 3, especially for a lens or a lens blank. Fundamentally direct holding or clamping of the workpiece 3 can take place. Preferably the workpiece 3, especially if it is a lens or a lens blank, is however held indirectly via a holder, especially a so-called blocking piece 6. The blocking piece 6 is then clamped.

If the lens is machined as a workpiece 3, it is preferably temporarily attached to an assigned holder, such as the so-called blocking piece 6. The state which is associated with the blocking piece 6 is also called "blocked" or "blocked up".

Blocking, therefore temporary fastening, on the blocking piece 6 can take place for example, by an alloy which melts preferably at a low temperature, such as a so-called alloy block material, a resin, an adhesive, a plastic, an adhesive tape or the like and is known from the prior art. The blocking piece 6 can then be clamped into the holding fixture 5, especially so that the blocking piece 6 and the workpiece 3 or the lens have a defined rotary position.

By means of the workpiece spindle 4 the held or clamped workpiece 3 can be set into rotation for machining. The workpiece spindle 4 therefore forms especially a rotary drive for the workpiece 3. The workpiece spindle 4 forms especially a computed or controlled round axis C. In particular a CNC control of the workpiece spindle 4 or of the rotation of the workpiece 3 takes place.

The workpiece 3 can be set or positioned relative to the tool 2. In the illustrated example the tool spindle 4 and thus the workpiece 3 can be set or positioned preferably in the W direction to the tool 2 and/or can be moved in the X direction transversely to the feed direction (cross feed), especially by means of a compound slide. In particular the controlled W axis and X axis or linear axes are formed. Basically also other or additional directions and/or axes of movement are possible. In particular, the axial alignment of the rotary or round axis C of the workpiece spindle 4 can also run obliquely to the W direction or to the X direction.

The direction of the Z axis on the one hand and the direction of the W axis or the axial alignment of the rotary or round axis C on the other can run parallel to one another or tilted to one another and/or can be adjusted to one another. At a relative tilt it is preferably small such that the preferred face turning can still take place in the desired or necessary manner for machining of the workpiece 3 or of the lens.

The term "axis" in this invention is defined especially preferably within the scope of the terminology in CNC controls (numerical or computerized controls) as a controlled or regulated or computed axis of movement, such as a linear axis or round axis.

To machine the workpiece 3 the tool 2 is moved into contact with the surface of the workpiece 3, especially the tool 2 cutting the workpiece 3. Preferably the workpiece 3 rotates during machining and the tool 2 is moved along the rotating workpiece 3. This can lead in the first approach to a structure of the workpiece 3 which is rotationally symmetrical to the axis W. If structures which differ therefrom are intended, the tool 2 can be moved synchronized to the rotary motion or the rotary position of the workpiece 3.

In particular, with the device 10 machining can take place or there can be a structure as described in European Patent Application EP 0 849 038 A2 or German Patent Application DE 10 2009 011 194 A2 which corresponds to U.S. Patent Application Publication 2010/224,039 which is hereby incorporated by reference.

For example, the workpiece 3 or its surface can acquire, by machining, especially in addition to a rotationally symmetrical structure, a nonrotationally symmetrical, for example, cylindrical component, especially the tool 2 being moved in up and down motion, especially in the direction of the Z axis, with twice the rotation frequency. In lens fabrication, especially for producing so-called free-form surfaces, for example, for progressive lenses or glasses, a much more complex movement of the tool 2 can be necessary. "Free-form surfaces" within the scope of this invention are characterized especially in that a closed mathematical description is not possible or only a roughly mathematical description, for example, by bicubic or higher splines or the like, is possible. In this case the complex movement of the tool 2 can have different spectral portions or frequencies or can be composed of them, especially harmonics with respect to the rotary speed or rotary frequency of the workpiece 3.

The movement of the tool 2 by the drive 1 is preferably regulated or controlled since a simple control of the movement would lead to high tolerances or errors. This applies especially in conjunction with high rotary speeds of the workpiece 3 and/or a fast movement or acceleration of the tool 2, such as is necessary especially for the preferred HSC.

In HSC, preferably at very high cutting speeds, especially between 1 m/s to 100 m/s and/or in conjunction with turning or milling, rotational speeds between 10000 and 100000 revolutions per minute are used, and for example, a comparatively thin chip is removed; this leads to reduced friction losses with simultaneously increased machining speed. In this connection rapid and at the same time precision movement of the tool 2 with respect to the workpiece 3 or with respect to a point on the axis of rotation of the workpiece 3 is necessary. Correspondingly prompt control of the tool 2 or of the drive 1 which is assigned to it can however lead to instabilities. Overshoot of the tool 2 in the boundary region of the stability of the control can lead to the specifications for the workpiece 3 no longer being able to be observed. A control with a small overshoot width, especially at least essentially without overshoot, is therefore preferred, but can be comparatively slow. A slow control can cause a contouring error, the tool 2 not reaching or not entirely reaching the desired position or the variable setpoint which is given by a reference variable A. Therefore, preferably in addition to control, pilot control also takes place.

The device 10 preferably has a control apparatus 11 and a pilot control apparatus 12 as is only schematically suggested in FIG. 1. The pilot control apparatus 12 can form part of the control apparatus 11 or can be integrated into it.

Figure 2:
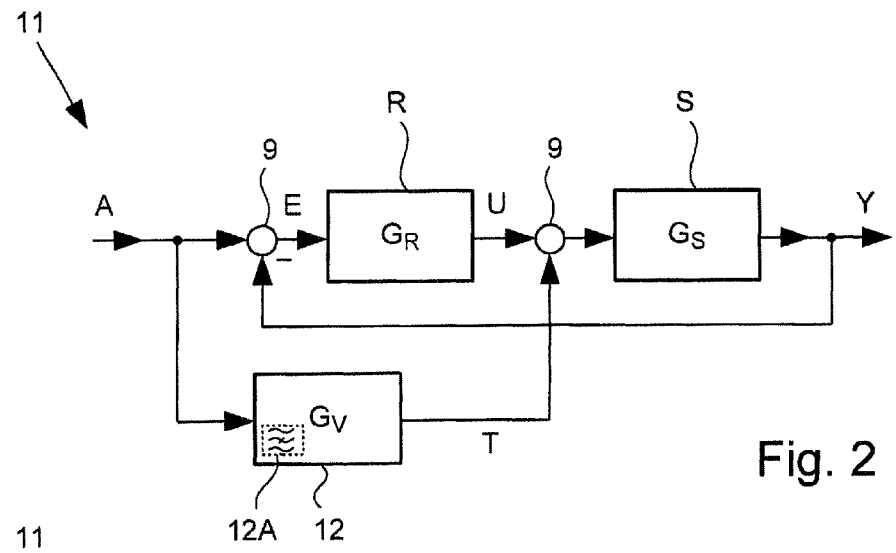
FIG. 2 shows a schematic structure of a control apparatus of the device.

FIG. 2 shows the control apparatus 11 with the pilot control apparatus 12 in a schematic. A reference variable A can be or have for example, a set position for the tool 2. The reference variable A can vary over time. For control, a controlled variable Y is subtracted from the reference variable A and a resulting error E is processed into a manipulated variable U with a controller R which has a transfer function $G_R$. The manipulated variable U can be or can form for example, a control signal, armature current or the like for the drive 1 in combination with the tool 2. A controlled system S or control loop, for example, the drive 1 in combination with the tool 2, converts the manipulated variable U into the controlled variable Y, especially therefore a control signal or armature current into a position of the tool 2. The controlled system S can be imaged or approximated by transfer function $G_S$ which describes the conversion of the manipulated variable U into the controlled variable Y. One especially preferred configuration of the control apparatus 11 is detailed below using FIG. 3.

In order to reduce the contouring error or to compensate for it, there is the pilot control or pilot control apparatus 12. The pilot control apparatus 12 forms from the reference variable A, preferably with a transfer function $G_V$, a pilot variable T which is preferably added to the manipulated variable U, in particular on or with a summation point 9, adder or the like. In this way, with a control which is not critical with reference to instabilities, specifically the pilot control, the manipulated variable can be moved into the vicinity of a target value for the manipulated variable and the controller R must consequently compensate only for the influencing quantities and/or possibly the inaccuracies of the pilot control. The improvements of the pilot control in accordance with the invention can therefore reduce the contouring error and/or the demands on the control or the complexity of the control and/or can enable accelerated machining of the workpiece 3 and/or lower tolerances.

To date a fixed transfer function $G_V$ has been used for pilot control. In accordance with the invention the transfer function $G_V$ is especially adaptively determined or matched or optimized or varied, as explained below.

For reasons of clarity, FIG. 1 shows the control apparatus 11 only in part; it is represented especially by the manipulated variable U and the pilot control apparatus 12. With reference to the movement of the tool 2 or of the drive 1 which is to be controlled from FIG. 1 it was already mentioned that the movement or the reference variable A, especially with respect to the machining speed, can have different frequencies and spectral portions. It was ascertained that the contouring error depending on the frequency of movement B of the tool 2 also has different portions or instances. It was furthermore ascertained that consideration of this frequency dependency in the pilot control or pilot control apparatus 12 can lead to a significant reduction of the contouring error. In particular it is possible to preferably compensate for the contouring error for certain frequencies. Thus, for example, in the production of free-form surfaces in lens production the precision of the finished lens can be greatly improved.

Therefore, it is proposed that the frequency of movement B especially of the tool 2 or of the drive 1 or of the corresponding reference variable A be considered and the pilot control or its transfer function be adapted or varied and/or damped depending on the frequency of movement B.

The frequency of movement B corresponds in this case to the reference variable A, especially to a time characteristic of the reference variable A. The reference variable A can be for example, a position, acceleration, velocity or the like, the reference variable A being variable over time. This time-variable characteristic of the reference variable A can have one or more different frequencies or frequency portions. The movement of the drive 1, the tool movement and other variables of the control, especially reference variables which have been derived singly or several times, correspond to the reference variable A and can be used alternatively or additionally to it in order to determine the frequency of movement B and/or to be considered in the pilot control. The time characteristic of the reference variable A and/or the frequency of movement B can depend on the machining speed or the rpm of the workpiece 2.

The frequency of movement B within the scope of this invention is preferably a frequency, harmonic wave, harmonic, or harmonic component with the greatest amplitude, or an average frequency, especially a frequency which has been averaged with consideration of the respective amplitudes or spectral power densities. This frequency of movement B in accordance with the invention corresponds to the reference variable A, therefore can be determined or derived from it or a corresponding quantity.

It is especially preferred that at least one pilot factor F be determined depending on the frequency of movement B and this pilot factor F, preferably multiplied by a pilot value, be used for pilot control. The pilot factor F is therefore preferably part of the transfer function $G_V$ of the pilot control apparatus 12 and can influence it. The pilot value, preferably a quantity which is derived from the reference variable A, especially the reference variable A which has been derived singly or several times, describes the dependency of the pilot variable T on the reference variable A, the pilot value being especially weighted by the pilot factor F and the pilot factor F being determined or changed in accordance with the invention depending on the frequency B of movement.

The workpiece 3, especially the lens which is to be machined or produced, can have one or more machining regions 3A. One machining region 3A can be for example, a region with a certain rotational velocity or cutting speed, therefore a relative speed of the tool 3 to the surface of the workpiece 2. Alternatively or in addition one machining region 3A can be a three-dimensional or surface region or section of the workpiece 3 and/or a region of a machining profile or of a profile of the reference variable, especially with a similar characteristic of the reference variable A, the machining speed or rpm. For example, in the machining of lenses the movement of the tool 2 to be carried out can depend largely on whether the border region or regions in the vicinity of the axis of rotation or round axis C are being machined, especially when the optical lens which is to be produced has free-form surfaces or the like. Thus a machining region 3A can be an annular partial region of the workpiece 3 and/or one which is centered around the axis of rotation or round axis C, or a quantity which corresponds to it. For example, the pilot factor, especially continuously or incrementally, can be chosen or changed depending on the distance of the tool 2 from the axis of rotation or round axis C, for example, correlating to a change of the rotation frequency or rpm of the workpiece 3. For helical machining of the surface of the workpiece 3, as is conventional in a lens, this machining region 3A can correspond to one or several helical turns and/or a region which is symmetrical to the round axis C.

It is possible and preferred especially for machining regions 3A which differ greatly that one or more corresponding frequencies B of movement and/or pilot factors F be determined for the machining region or regions 3A. This makes it possible to match the pilot control adaptively to the current profiles which are to be followed with the tool 2; this can reduce the contouring error or compensate further or in addition for it, especially in the middle, over the entire workpiece.

The frequency of movement B is preferably determined from the reference variable A or from a characteristic which corresponds to it. As already mentioned initially, the reference variable A or the characteristic corresponding to it can be analyzed, preferably by a transform, especially a discrete and/or Fourier transform, especially therefore the reference variable A or the characteristic corresponding to it is divided into frequency portions or a spectrum for it is computed or generated. The spectrum or the frequency portions can be used selected, weighted and/or averaged for determining, especially computing, the frequency B of movement.

In one specific example a frequency of movement B and/or an assigned pilot factor F can be determined especially iteratively and/or empirically for reduction of a contouring error, especially the contouring error being determined, minimized and/or compensated. It is therefore possible, for example, before machining of the workpiece 3, preferably by computation, simulation or a test run, at different frequencies B of movement to determine optionally different pilot factors F at which the contouring error is minimized or compensated. This assignment of the frequency of movement B to the pilot factor F, especially as a filter function, profile, table or assignment function, especially a polynomial approximation or spline approximation, or the like, can be used to adapt the pilot control apparatus 12 in current operation. This can be achieved for example, by a filter 12A in the pilot control apparatus 12, the filter properties or coefficients and/or the transfer function $G_V$ of the pilot control apparatus 12 being determined, especially computed, with the assignment or by the spline approximation.

For example, to determine the assignment of the frequency of movement B to the pilot factor F or a filter function which corresponds to it, a computer, controller or calculator 7 or some other programmable apparatus can be used. Thus for example, suitable pilot factors F can be determined preferably from sensor information about the position of the tool 2 in a test pass with different frequencies B of movement. Alternatively or in addition the pilot factor F can be filed or stored especially in a database 8 depending on the frequency B of movement, especially as a table, function, spline or the like.

In particular, in current operation a pilot factor F which is assigned to a frequency of movement B can be read out, computed, determined and/or taken into account. In operation, a pilot factor F can be read out of the database 8 depending on the frequency of movement B and pilot control with this pilot factor F can take place.

If necessary the frequency of movement B can be read out of the database 8 and/or computed and/or considered by the filter 12A.

The pilot apparatus 12 can therefore be adaptively and/or dynamically matched by the pilot factor F depending on the machining frequency B.

Figure 3:
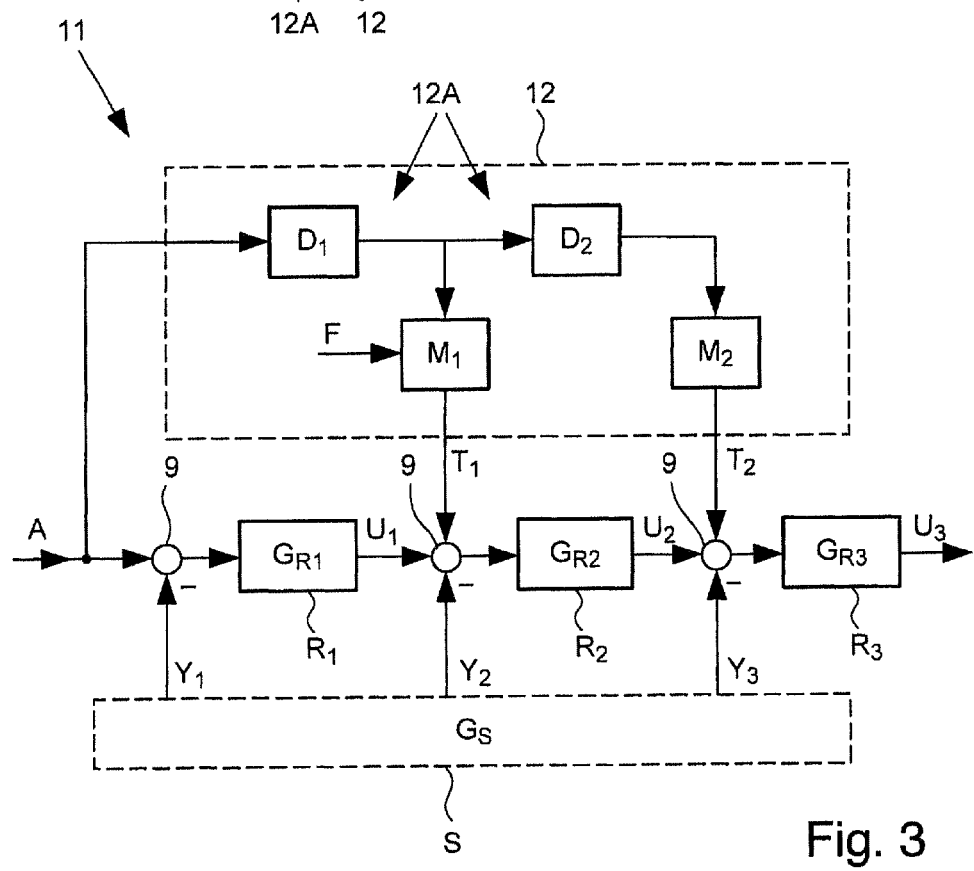
FIG. 3 shows a detailed structure of the preferred cascaded control apparatus.

Hereinafter, an especially preferred configuration of the control apparatus 11 is detailed. FIG. 3 shows the control apparatus 11, preferably for use for the drive 1, especially for a tool 2 or workpiece 3, and/or for producing or machining an optical lens, especially as shown in FIG. 1. In particular the pilot control in accordance with the invention can also be used for the control of a drive of the workpiece 3 and/or for other purposes, such as mounting of components.

FIG. 3 shows a cascaded, therefore a multistage control apparatus 11. A cascaded control, especially for different stages of the cascaded control pilot control taking place depending on the frequency B of movement, is especially exact and therefore preferred. But fundamentally it is already possible with one stage to acquire the advantages of this invention. Therefore the principle is explained below primarily on a first stage.

A first controller $R_1$ with a transfer function $G_{R1}$ processes the difference of the reference variable A and a first controlled variable $Y_1$ into a first manipulated variable $U_1$. Furthermore, in the pilot control apparatus 12 with a differentiator $D_1$ the reference variable A is differentiated and the differentiated reference variable A is multiplied by the pilot factor F using a multiplier $M_1$ into a first pilot variable $T_1$. This multiplication forms a modified, especially weighted pilot variable $T_1$. The pilot factor F in the illustrated example is greater than 0, preferably greater than 0.5 or 50%, especially greater than 0.8 or 80% and/or less than 2 or 200%, preferably less than 1.5 or 150%, especially less than 1.2 or 120%, depending on the frequency B of movement.

Instead of multiplication for modification of the first unmodified pilot variable, which modification is dependent [on] the frequency of movement, any other conversion, filtering or the like can take place. Therefore multiplication is not essential.

It should be further noted that the preferred differentiation for determining the unmodified pilot variable from the reference variable A is preferred, but not essential. Rather the unmodified pilot variable can also be determined or derived in some other suitable manner.

Moreover, it is possible that the determination of the unmodified reference variable which takes place here in one step, and the subsequent modification of the reference variable dependent [on] the frequency of movement, which modification takes place here in a second step, take place together in a common step or determination process.

The first manipulated variable $U_1$ is then combined with a first pilot variable $T_1$, especially at a summation point 9.

Preferably, the reference variable A represents a position, especially a set position of the tool 2. The first controlled variable $Y_1$ in this case represents the current position of the tool 2. The first manipulated variable $U_1$ and/or the first pilot variable $T_1$ corresponds preferably to a speed. The multiplier $M_1$ can also be or have a filter 12A.

A second or further stage of the control apparatus 12 can be structured accordingly. In the illustrated exemplary embodiment, the differentiated reference variable A is differentiated by a second differentiator $D_2$ a second time and is multiplied by a second pilot factor F into a second pilot variable $T_2$ using a second multiplier $M_2$. The sum of the first manipulated variable $U_1$ and first pilot variable $T_1$ minus a second controlled variable $Y_2$ is made available to a second controller $R_2$. The second controlled variable $Y_2$ can be or represent, for example, a speed. The second controller $R_2$ generates a second manipulated variable $U_2$. The latter can in turn be combined with the second pilot variable $T_2$. In the illustrated example, a third controlled variable $Y_3$, especially an acceleration and/or at a summation point 9 is subtracted therefrom. The result is preferably processed with a third controller $R_3$ into a third manipulated variable $U_3$.

This third manipulated variable $U_3$ can be, for example, a control signal, armature current or the like or can correspond thereto. Therefore it can be especially provided that the third manipulated variable $U_3$ is used for monitoring of the drive 1 and/or of the movement of the tool 2. The first controlled variable $Y_1$, the second controlled variable $Y_2$ and the third controlled variable $Y_3$, especially also the position, speed and acceleration of the drive 1 or tool 2, can be determined from the physical behavior, especially by means of sensors or the like, and/or by the transfer function $G_S$ of the controlled system corresponding preferably thereto.

According to one aspect of this invention which can be implemented independently, it is possible, especially alternatively or in addition to the multiplier $M_1$, $M_2$, to consider the frequency of movement B by a filter 12A. Preferably, it can be a filter 12A which implements a frequency-dependent pilot factor F, especially has damping which can vary over the frequency. In particular, the filter 12A therefore implements a multiplication by a pilot factor which can correspond to damping. The filter 12A can be determined, for example, as an assignment of the frequency of movement B to the pilot factor F, especially therefore by simulation or test run with determination or minimization of the contouring error.

In accordance with the invention, at least one pilot factor F of the cascaded control apparatus 11 or pilot control apparatus 12 from FIG. 3 is determined depending on the frequency of movement B. But, it is especially preferable to use several and/or different pilot factors F for the first multiplier $M_1$, the second multiplier $M_2$, and/or for optional further multipliers and/or preferably to determine all pilot factors F of the pilot control apparatus 11, especially also independently of the specific example, depending on the frequency B of movement. For example, for a frequency of movement B also several pilot factors F assigned to different stages of the control apparatus 12 or pilot control apparatus 11 can be filed or stored especially in a database 8, or a corresponding pilot factor F can have different values for different stages or multipliers M. The multiplier M or the filter or filters 12A can moreover be formed to take into account or implement a time shift. Furthermore, the pilot control apparatus 11 or part of it can be formed separately from other components of the control apparatus 12. In particular, the pilot control apparatus 11 can be part of a CNC control.

In practical use, it can be sufficient to interpret the current rotational speed of the workpiece 3 or a harmonic thereof as the frequency of movement B and to carry out or adjust the pilot control subsequently depending on the number of revolutions of the workpiece 3. For example, for the rpm of the workpiece 3 or of the spindle 4 one or more pilot factors F can be determined, for example, by an assignment table, matrix, assignment function, especially an approximated function, such as a regression polynomial or spline approximation.

In conjunction with the exemplary embodiment from FIG. 1, the invention is explained in detail using the face turning of an optical lens. In particular, preferably, a blank for an optical lens as a workpiece 3 is machined by face turning and/or high speed cutting, the tool 2 driven by the drive 1 cutting the lens. Alternatively or in addition, it is also possible to use the method in accordance with the invention and the pilot control in accordance with the invention in any other devices, drives or control for cutting or even for non-cutting machining or other drives or controls.

In the exemplary embodiment, the tool 2 is moved especially in translation. In this connection, it is noted that the reference variable A corresponds preferably to a position or movement of the tool 2 with respect to the workpiece 3 or to a point on an axis of rotation of the workpiece 3. Therefore, it does not matter in particular whether the workpiece 3 or the tool 2 is turning or is moving. However, it is preferred that the tool 2 and workpiece 3, especially with reference to one another, have rotational movement, its furthermore being preferred that the drive 1 controlled with the method in accordance with the invention can generate motion relative to one point on one axis of rotation. The workpiece 3 can therefore be rotated relative to the tool 2 with a rotational velocity and the frequency of movement B can depend on the rotational velocity or angular velocity.

It is especially preferred that the tool 2 be moved in translation and/or with reference to a point of an axis of rotation of the workpiece 3 with the frequency B of movement. Furthermore the reference variable can correspond to a position or movement of the tool 2 with reference to the workpiece 3 or to a point of an axis of rotation of the workpiece 3. This includes especially cases in which a workpiece 3 rotates and a tool 2 is moved against the rotating workpiece 3 (turning) and/or a rotating tool 2 is guided along a workpiece 3 at least tangentially (milling). The drive is especially preferably controlled and piloted here and is assigned to the tool 2. This however does not represent an essential assumption.

Furthermore, the pilot control in accordance with the invention can also be used in different controls which need not necessarily be associated with a tool 2 and/or a workpiece 3. Therefore it is also possible in accordance with the invention to determine a frequency of movement B which corresponds to a reference variable A and to influence or adapt the pilot control or the pilot control apparatus 12 depending on the frequency B of movement, especially when prompt, stable control with small contouring errors is necessary or advantageous. In addition to any fabrication methods, this also includes other methods, especially in which a reference variable occurs which changes dramatically over the frequency.

What is claimed is:

1. A method for controlling of a drive for a tool or workpiece, comprising the steps of:
    performing pilot control of the drive depending on a frequency of movement which corresponds to a reference variable,
    determining or computing at least one of a frequency component of the reference variable, and characteristic corresponding to a spectrum of the reference variable, and a part thereof,
    using the at least one of said frequency component, said spectrum, and said part thereof as the frequency of movement,
    determining at least one pilot factor depending on the frequency of movement, and
    using the at least one determined pilot factor determined, multiplied with a pilot value, for pilot control, wherein said pilot value corresponds to or is a derivative of the reference variable component values with a weight or scalar or for removing noise form said frequency.

2. The method as claimed in claim 1, wherein one of the reference variable and a characteristic corresponding to the reference variable is analyzed to determine the frequency of movement.

3. The method as claimed in claim 2, wherein a transform is used to analyze said one of the reference variable and a characteristic corresponding to the reference variable.

4. The method as claimed in claim 1, a filter is used for taking the frequency of movement into account.

5. The method as claimed in claim 1, wherein a frequency or harmonic with a highest amplitude or an average frequency of said one of the reference variable and the characteristic corresponding to the reference variable is determined or computed as the frequency of movement.

6. The method as claimed in claim 1, wherein a frequency which has been averaged with consideration of an amplitude is determined or computed as the frequency of movement.

7. The method as claimed in claim 1, wherein, for a workpiece having a plurality machining regions, at least one of corresponding frequencies of movement and pilot factors are determined.

8. The method as claimed in claim 1, wherein the frequency of movement and an assigned pilot factor are determined for reduction of a contouring error.

9. The method as claimed in claim 1, wherein in operation, a pilot factor is read out of a database depending on the frequency of movement or a quantity corresponding to the frequency of movement, and wherein pilot control takes place using pilot factor read out.

10. The method as claimed in claim 1, wherein cascaded pilot control is performed with different stages of the cascaded control pilot control taking place depending on the frequency of movement.

11. The method as claimed in claim 1, wherein a workpiece is rotated relative to the tool with a rotational velocity, and wherein the frequency of movement dependent on the rotational velocity.

12. The method as claimed in claim 1, wherein an optical lens is used as a workpiece, and is machined by at least one of face turning and high speed cutting, and wherein the tool is driven by the drive.

13. The method as claimed in claim 1, wherein a plurality of said pilot factors are determined prior to machining of the workpiece at different frequencies of movement.

14. The method as claimed in claim 1, wherein a plurality of said pilot factors are determined by at least one of computation, simulation and a test run for different frequencies of movement.

15. The method as claimed in claim 1, wherein assignment of the frequency of movement to the at least one pilot factor is determined by at least one of a filter function, profile, table and assignment function.

16. The method as claimed in claim 1, wherein in current operation, a pilot factor which is assigned to a respective frequency of movement or a quantity which corresponds to the frequency of movement is at least one of read out and is tracked.

17. The method as claimed in claim 1, wherein the pilot control is matched adaptively to current profiles which are to be followed with the tool for at least one of different machining regions, corresponding frequencies of movement and pilot factors (F) being determined.

18. The method as claimed in claim 1, wherein the frequency of movement is considered in the pilot control by a filter.

19. The method as claimed in claim 1, wherein the pilot factor multiplied by a pilot value is used for pilot control.

20. The method as claimed in claim 19, wherein the pilot value at least one corresponds to the reference variable and is derived from the reference variable.

* * * * *